(12) United States Patent
Baumgart et al.

(10) Patent No.: US 7,321,476 B2
(45) Date of Patent: *Jan. 22, 2008

(54) METHOD AND SYSTEM FOR DETERMINING CONTACT POTENTIAL IN A HARD DISK DRIVE

(75) Inventors: Peter Michael Baumgart, San Jose, CA (US); Bernhard E. Knigge, San Jose, CA (US); Charles Mathew Mate, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/192,860

(22) Filed: Jul. 29, 2005

(65) Prior Publication Data

US 2005/0270684 A1    Dec. 8, 2005

Related U.S. Application Data

(63) Continuation-in-part of application No. 10/691,752, filed on Oct. 22, 2003, now Pat. No. 7,016,139.

(51) Int. Cl.
*G11B 27/36*    (2006.01)
*G11B 21/02*    (2006.01)

(52) U.S. Cl. ............................. 360/25; 360/31; 360/75; 360/77.03

(58) Field of Classification Search ..................... None
See application file for complete search history.

(56) References Cited

U.S. PATENT DOCUMENTS

| 6,529,342 | B1 * | 3/2003 | Feng et al. | 360/75 |
| 6,785,081 | B2 * | 8/2004 | Chapin et al. | 360/75 |
| 7,199,960 | B1 * | 4/2007 | Schreck et al. | 360/75 |
| 2006/0002001 | A1 * | 1/2006 | Fong et al. | 360/75 |

\* cited by examiner

*Primary Examiner*—Thang V. Tran
*Assistant Examiner*—Jason Olson (57) ABSTRACT

A method and system for determining contact potential voltages between a slider body and a hard disk of a hard disk drive. In embodiments of the present invention, at least one continuous negative direct current (DC) voltage is applied between a slider body and a hard disk of a hard disk drive. Then, at least one continuous positive direct current (DC) voltage is applied between the slider body and the hard disk. A contact potential voltage between the slider body and the hard disk is then determined in response to the applying of the direct current voltages.

19 Claims, 9 Drawing Sheets

METHOD AND SYSTEM FOR DETERMINING CONTACT POTENTIAL IN A HARD DISK DRIVE

RELATED APPLICATIONS

The present invention is a continuation in part of co-pending and commonly owned U.S.P.T.O. application Ser. No. 10/691,752 filed Oct. 22, 2003 now U.S. Pat. No. 7,016,139 titled "Magnetic Recording Disk Drive with Actively Controlled Electric Potential at the Head/Disk Interface for Wear and Durability Control," by Peter Baumgart, Bernhard Knigge, and Matthew Mate, assigned to the assignee of the present invention, and which is hereby incorporated by reference in its entirety herein.

FIELD OF THE INVENTION

Embodiments of the present invention are related to measurement of contact potential voltages between a slider body and a disk surface of a hard disk drive.

BACKGROUND OF THE INVENTION

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a substantially constant rotational speed. An actuator arm or slider is utilized to reach out over the disk. The arm has a head-gimbal-assembly (HGA) composed of a suspension, flexure and a slider carrying the read/write components.

In operation, the hard disk is rotated at a set speed via a spindle motor assembly having a central drive hub. Additionally, there are tracks evenly spaced at known intervals across the disk. When a request for a read of a specific portion or track is received, the actuator and servo-system of the hard drive aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

As the data storage industry constantly strives to improve data storage density, it is becoming increasingly important to reduce the clearance of slider assembly over the surface of the magnetic disk. However, as the slider-to-disk spacing becomes smaller than 10 nanometers (10 nm), the electrostatic and intermolecular forces between the slider and disk become increasingly significant. Therefore, a need exists for determining contact potential voltages and clearance data between a slider body and a hard disk of a hard disk drive.

However, the small drives have small components with very narrow tolerances. Disk drive sliders are designed to fly in very close proximity to the disk surface. For instance, in some systems slider may be designed to fly only three to five nanometers above the disk surface. In a system with such close tolerances, components can be subject to van der Waals, Meniscus, electrostatic, spindle motor charge up, and contact potential forces. These forces are due to a variety of causes, such as: the molecular attraction of components in very close proximity; adhesive friction caused by contact between the slider and the lubricant on the disk; the build up of electrical potential between the disk and the slider caused by the rotating disk surface (tribo-charging); the build up of electrical potential in motor bearings (tribo-charging); potential difference that exists between two different metals (different Fermi levels of slider and disk material); and impacts between the slider and disk surface. These forces alone, and in combination, create bouncing vibrations in the slider that can cause media damage and can also cause data loss during read and write operations.

SUMMARY OF THE INVENTION

A method and system for determining contact potential voltages between a slider body and a hard disk of a hard disk drive. In embodiments of the present invention, at least one continuous negative direct current (DC) voltage is applied between a slider body and a hard disk of a hard disk drive. Then, at least one continuous positive direct current (DC) voltage is applied between the slider body and the hard disk A contact potential voltage between the slider body and the hard disk is then determined in response to the applying of the direct current voltages.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
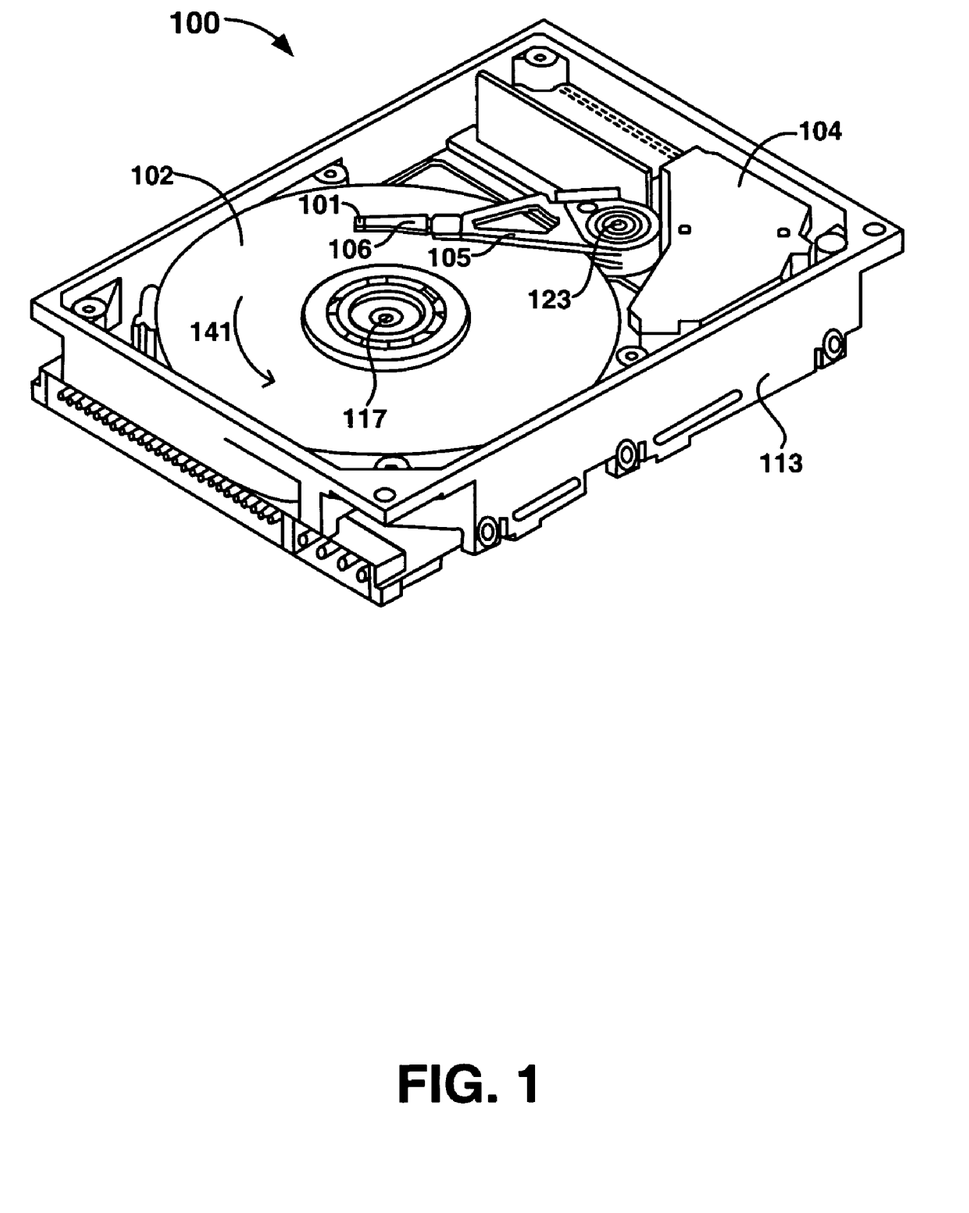
FIG. 1 is a perspective view of an exemplary hard disk drive in accordance with embodiments of the present invention.

With reference now to FIG. 1, a schematic drawing of one embodiment of a magnetic hard disk file or drive 100 in accordance with embodiments of the present invention is shown. Drive 100 has an outer housing or base 113 containing a disk pack having at least one media or magnetic disk 102. The disk or disks 102 are rotated (see arrows 141) by a spindle motor assembly having a central drive hub 117. An actuator comprising a plurality of parallel actuator arms 105 (one shown) in the form of a comb that is movably or pivotally mounted to base 113 about a pivot assembly 123. A controller not shown is also mounted to base 113 for selectively moving the comb of arms 105 relative to disk 102.

In the embodiment shown, each arm 105 has extending from it at least one cantilevered load beam and suspension 106. A magnetic read/write transducer or head is mounted on a slider 101 and secured to a flexure that is flexibly mounted to each suspension 106. The read/write transducer magnetically reads data from and/or magnetically write data to disk 102. The level of integration called the head gimbal assembly (HGA) is head and the slider 101, which are mounted on suspension 106. The slider 101 is usually bonded to the end of suspension 106. The head is typically pico size (approximately 1245×1000×300 microns) and formed from ceramic or intermetallic materials. The head also may be of "femto" size (approximately 850×700×230 microns) and is preloaded against the surface of disk 102 (in the range two to ten grams) by suspension 106.

Suspensions 106 have a spring-like quality, which biases or urges the air-bearing surface of the slider 101 against the disk 102 to cause the slider 101 to fly at a precise distance from the disk when drive 100 is in normal operation. An actuator 104 (e.g., a voice coil motor) is also mounted to arms 105 opposite the head gimbal assemblies. Movement of the actuator 104 by the controller moves the head gimbal assemblies along radial arcs across tracks on the disk 102 until the read/write transducer is positioned above the desired data track. The head gimbal assemblies operate in a conventional manner and typically move in unison with one another, unless drive 100 uses multiple independent actuators (not shown) wherein the arms can move independently of one another.

Figure 2:
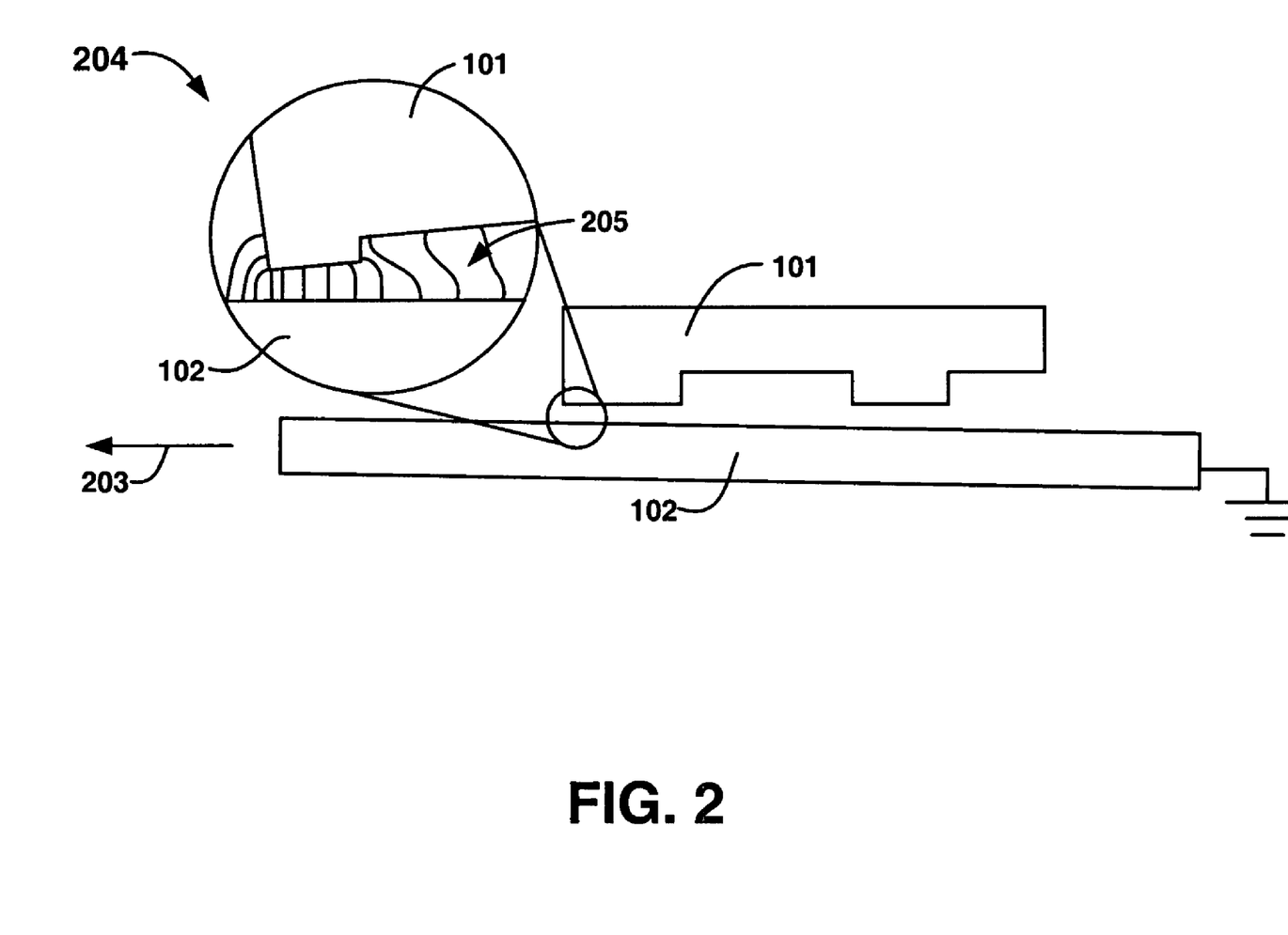
FIG. 2 shows an exemplary electrostatic field that exists between a slider body and a hard disk of a hard disk drive.

FIG. 2 shows in greater detail, the electrostatic interaction between slider body 101 and magnetic disk 102. In operation, magnetic disk 102 rotates from right to left with respect to slider body 101 (e.g., typically shown as arrow 203). Enlargement 204 of the slider/disk interface shows lines representing an electric field 205 that is formed from a potential difference between slider body 101 and hard disk 102. One source for the potential difference is the contact potential that originates from the conducting portions of the slider body 101 and hard disk 102 having different work functions.

The work function of a material is the amount of energy that is needed for releasing electrons from the surface of the material, and is related to the optical, electrical and mechanical properties of the material. When two materials having different work functions are brought together, electrons in the material having the higher work function tend to flow to the material having the lower work function. When the materials are made into a parallel plate capacitor, equal and opposite surface charges form on each material. The voltage formed between the plates of the capacitor from these charges is referred to as a "contact potential." In a typical slider/disk interface, the conducting part of the slider body (e.g., 101) is sintered $Al_2O_3$—TiC and the conducting part of the disk (e.g., 102) is a cobalt based alloy magnetic layer. Even if the slider and disk are both grounded, a potential difference can exist between them due to the contact potential, which may generate an electrostatic force greater than the van der Waals force.

Figure 3:
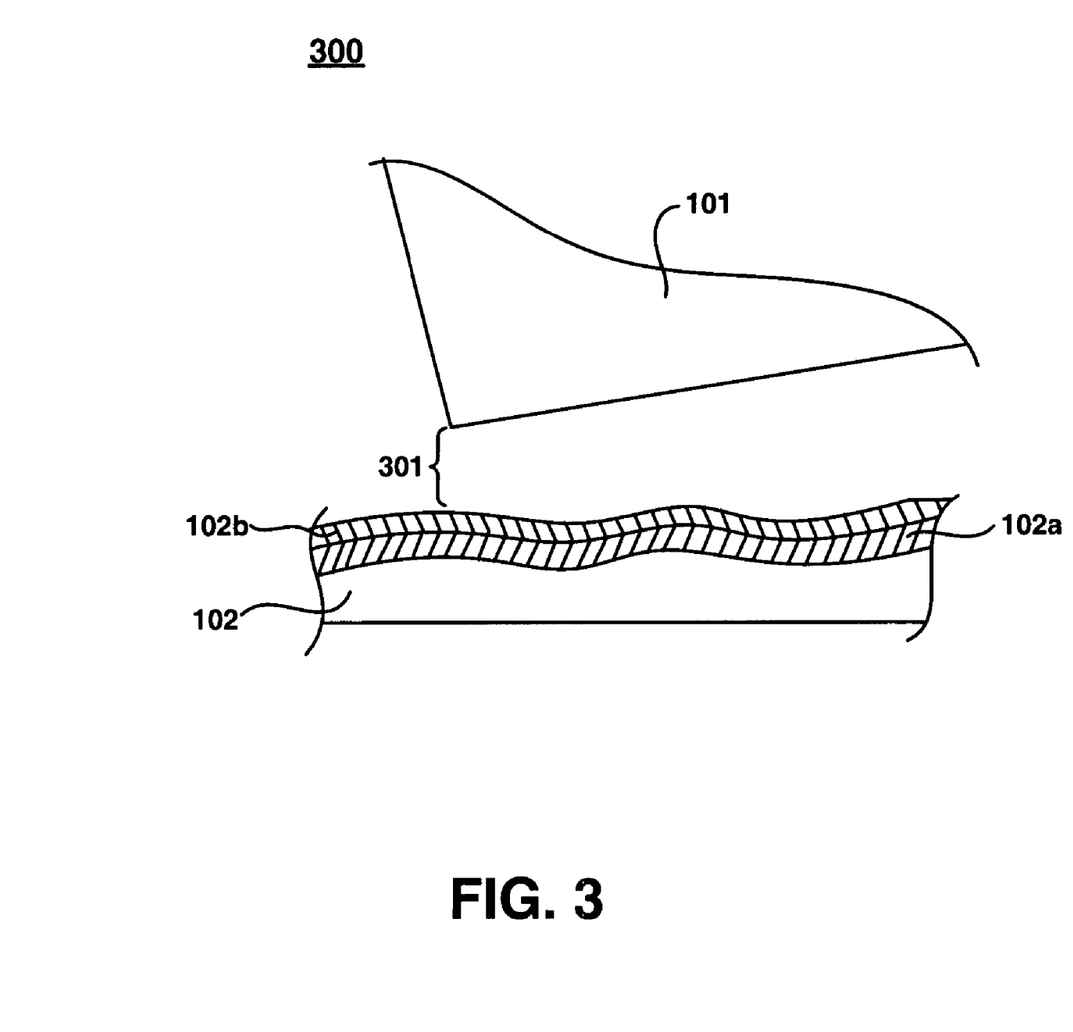
FIG. 3 shows in greater detail the relationship between a slider body and a hard disk of a hard disk drive.

As shown in FIG. 3, the respective work functions of the slider body and hard disk are further modified by overcoats and lubricants that are deposited for tribology protection. In FIG. 3, hard disk 102 is coated with a carbon coating 102a and a lubricant layer 102b. The clearance 301 is defined as the mechanical spacing from the lowest point of the slider body 101 to highest points of the lubricated asperities on the disk 102.

Figure 4A:
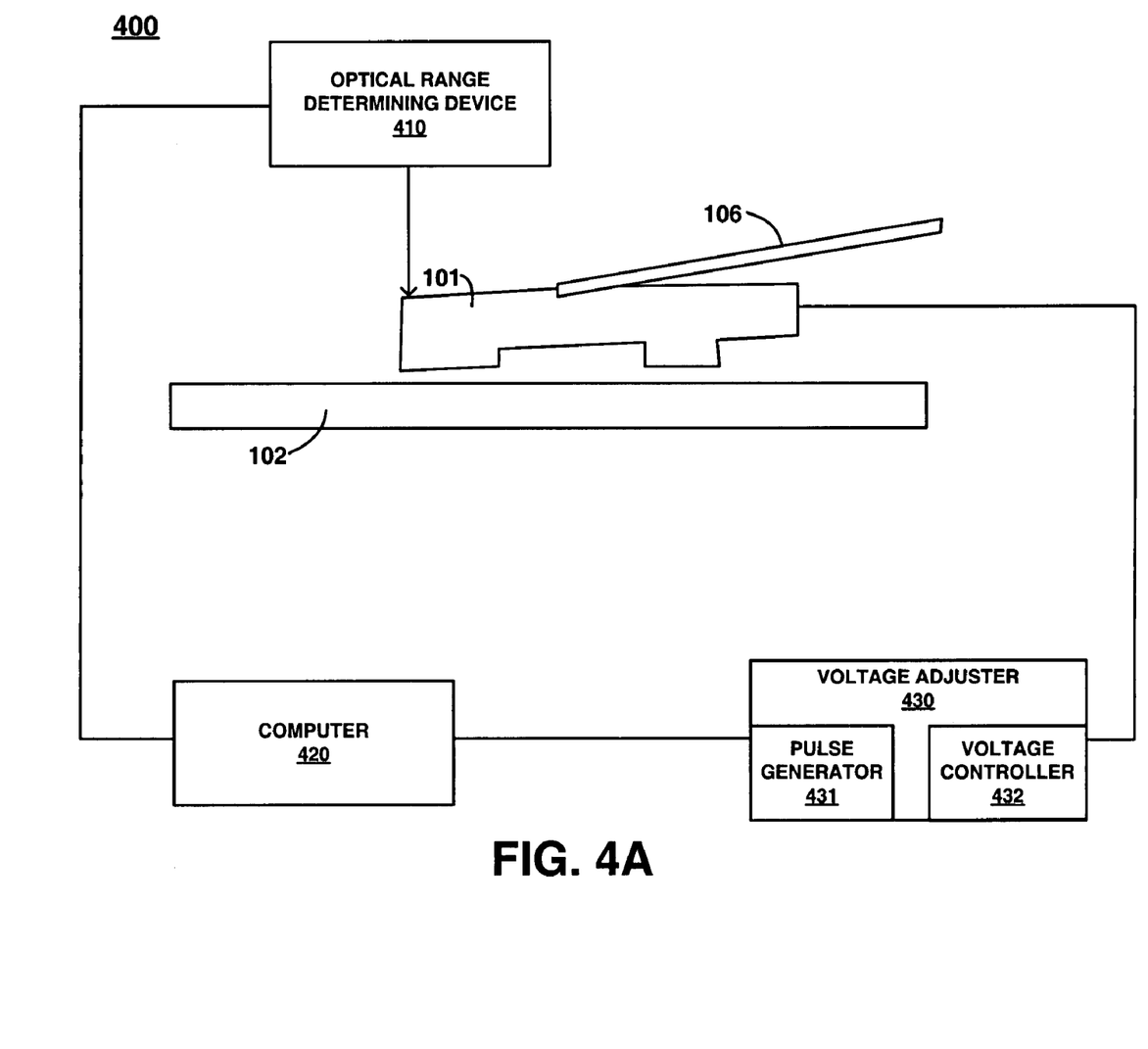
FIGS. 4A and 4B show embodiments of a system for determining contact potential voltage between a slider body and a hard disk of a hard disk drive in accordance with the present invention.

FIG. 4A shows a system for determining contact potential voltages and/or clearance data between a slider body and a hard disk of a hard disk drive in accordance with embodiments of the present invention. In FIG. 4A, a processor (e.g., computer 420) is coupled with a voltage adjuster 430 and an optical range determining device 410. In embodiments of the present invention, optical range determining device 410 is a laser measuring device such as a laser interferometer, a laser Doppler vibrometer, a near-field solid immersion lens (SIL) device, etc. In operation, optical range determining device 410 is optically coupled with slider body 101 and determines a distance thereto which can be used to determining the spacing change of slider body 101 relative to hard disk 102.

Figure 4B:
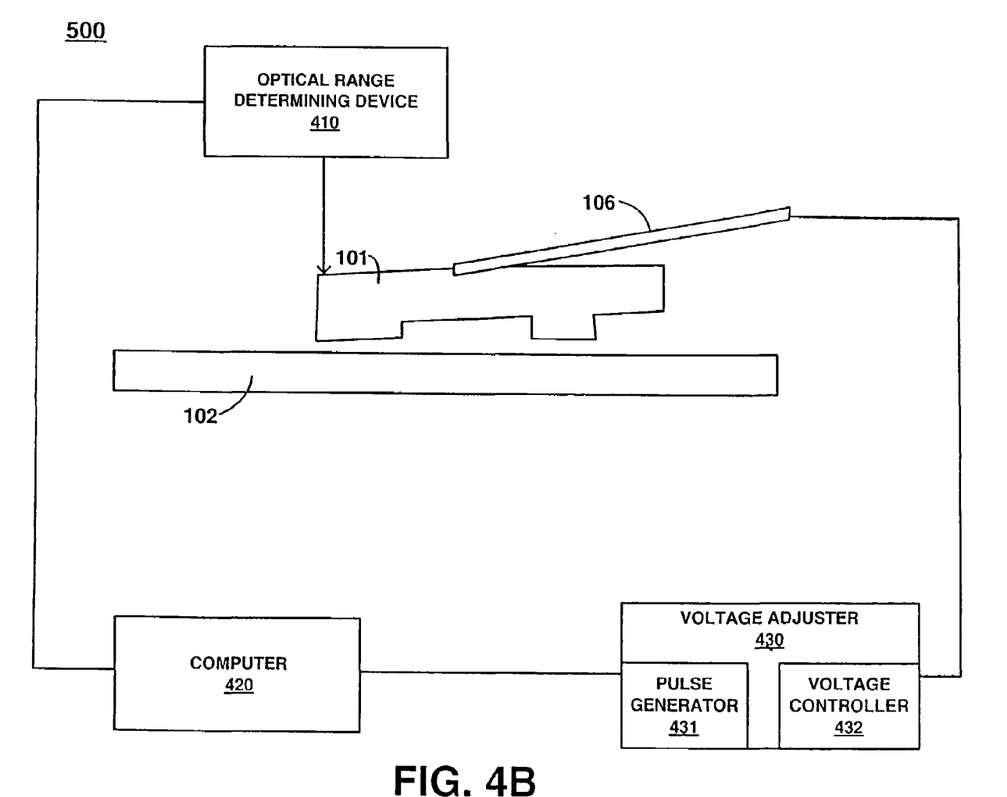

While the embodiments of FIGS. 4A and 4B shows the use of a optical range determining device, embodiments of the present invention are well suited to utilize other methods to determine the clearance change of slider body 101 relative to hard disk 102. In one embodiment, the read back signal amplitude change is used to determine spacing change. The read back signal amplitude vs spacing is described by the Wallace spacing equation which can be used to determine the clearance of slider body 101 relative to hard disk 102. More specifically, the amplitude of the readback signal varies exponentially to the clearance of slider body 101. Thus, when slider body 101 is closer to hard disk 102 (e.g., at a reduced clearance), the amplitude of the readback signal will be greater than when slider body 101 is further away from hard disk 102.

In another embodiment, a change in capacitance between slider body 101 and hard disk 102 is detected in response to a change in slider body clearance. For example, in embodiments of FIG. 4A, the slider body 101 is electrically isolated from suspension 106. As a result, system 400 effectively forms a capacitive loop and the slider body clearance will vary in response to changes in the voltage applied to the slider body/hard disk interface. A change in the capacitance (measured at the slider body/hard disk interface can be detected and used to determine the change in the slider body clearance.

In another embodiment, a change in the magneto-resistive resistance can be detected and used to determine a change in the slider body clearance. For example, as the clearance of slider body 101 relative to hard disk 102 decreases, the magneto-resistive resistance typically decreases due to increased disk cooling. Alternatively, the magneto-resistive resistance typically increases when contact between the slider body and hard disk occurs due to disk heating, thus causing an increase in the baseline magneto-resistive modulation.

Voltage adjuster 430 is coupled with slider body 101 and is for generating at least one continuous positive direct current (DC) voltage and at least one continuous negative direct current (DC) voltage between slider body 101 and hard disk 102. In the embodiment of FIG. 4A, slider body 101 is electrically isolated from suspension 106. Furthermore, in the embodiment of FIG. 4A, voltage adjuster 430 comprises a voltage generator 431, which generates the continuous positive and/or negative DC voltages and a voltage controller 432 which controls the voltage of the DC voltages. It is noted that the components shown in FIGS. 4A and 4B are exemplary, and that in other embodiments of the present invention computer 420 may be integrated with voltage adjuster 430 and/or optical range determining device 410.

In embodiments of the present invention, optical range determining device 410 measures the clearance change between slider body 101 relative to hard disk 102 in response to a change in the voltage and/or bias between slider body 101 and hard disk 102. In embodiments of the present invention, computer 420 causes optical range determining device 410 to measure the change in clearance of slider body 101 at a discrete location of hard disk 102 (e.g., a sector of a data track). Thus, rather than measuring the clearance during the entire period of a positive and/or negative DC voltage between slider body 101 and hard disk 102, the measurement is performed at a particular portion of the data track above which slider body 101 is positioned. This can be accomplished, for example, by timing the clearance measurement (e.g., of slider body 101) relative to the spindle index of hard disk 102, or relative to sector/servo positioning information.

In embodiments of the present invention, the change in clearance measurement can be repeated at that discrete location over a plurality of successive revolutions of hard disk 102. As a result, an average value of the change in clearance of slider body 101 and hard disk 102 can be determined when a given voltage and/or bias is applied at the interface. This improves the precision with which the contact potential voltage can be determined since measurement errors induced by non repeatable runout and slider dynamic modulation are eliminated. Additionally, a plurality of measurements at separate discrete locations can be made in a single revolution of hard disk 102, thus facilitating the localized measurement of contact potential voltages in different regions of hard disk 102.

FIG. 4B shows another embodiment of system 400 which is configured similarly to that described above with reference to FIG. 4A. However, in FIG. 4B, voltage adjuster 430 is coupled directly with suspension 106 rather than being directly coupled with slider body 101. Operation of the system shown in FIG. 4B is similar to that described above with reference to FIG. 4A.

Figure 5:
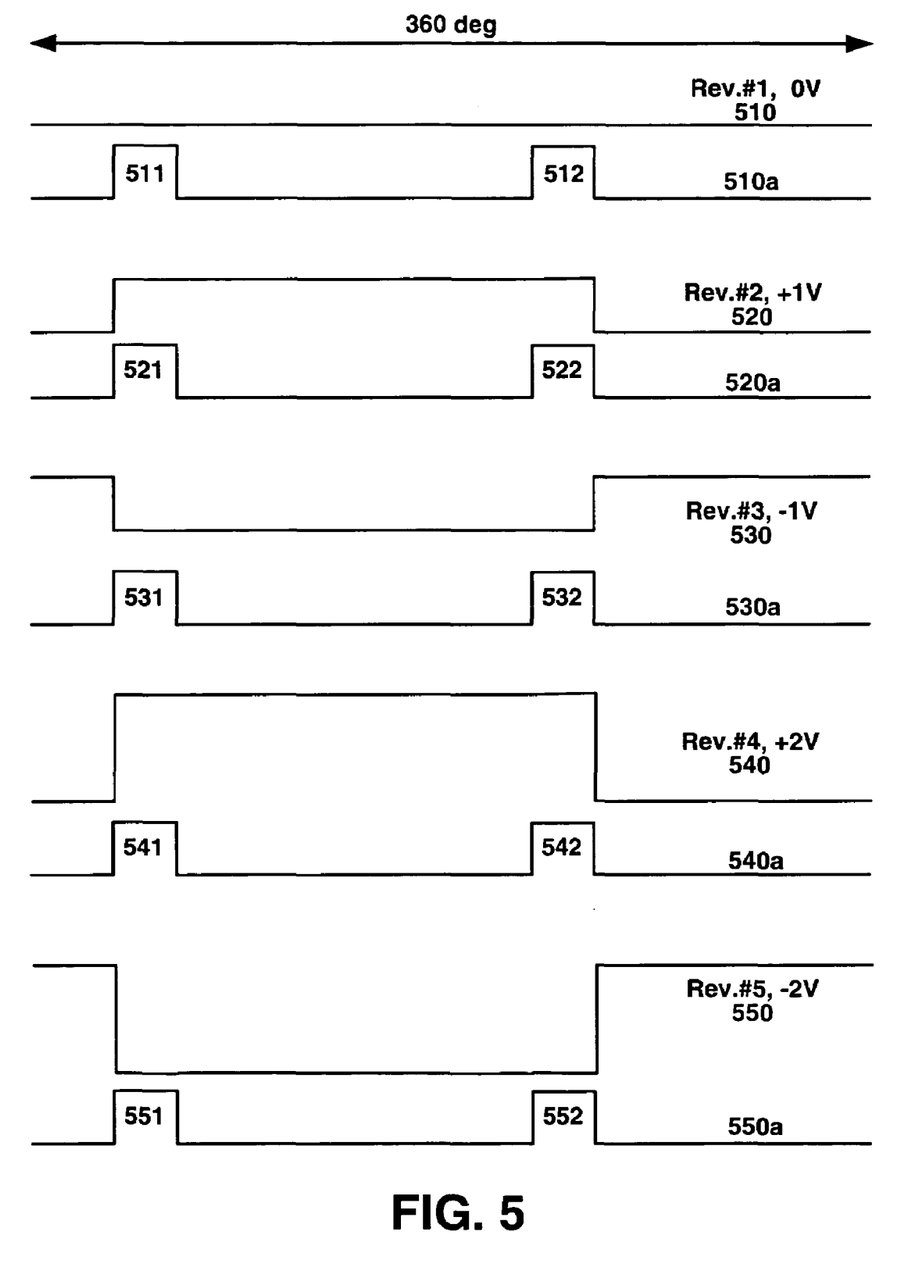
FIG. 5 shows five sets of exemplary bias voltages and control signals. The bias voltages are applied between the slier and disk at certain disk locations. The control signals tell the measurement system when to measure the change in clearance in accordance with embodiments of the present invention.

FIG. 5 shows exemplary bias voltages applied to locations of a hard disk and the control signals applied to a measurement system in accordance with embodiments of the present invention. In FIG. 5, a complete revolution of hard disk 102 is represented. It is noted that in embodiments of the present invention, the continuous DC voltages (e.g., positive and/or negative) may be applied during a single revolution of hard disk 102, a plurality of revolutions of hard disk 102, or a fraction of a revolution of hard disk 102 (e.g., as shown in FIG. 5). In one embodiment, the bias voltages represented in FIG. 5 are applied while slider body 101 is located over a single data track of hard disk 102.

In embodiments of the present invention, a first control measurement is performed without any voltages applied to the slider body. For example in revolution 1 no voltage (e.g., 510) is applied between slider body 101 and hard disk 102 and the baseline clearance measurement is established. Concurrently, the voltage between the slider and disk is increased in small increments and the change in clearance is measured. When the slider makes contact with the disk, further increase in the applied voltage will not cause further reductions in spacing. The actual clearance can then be estimated from the change in clearance at contact from the initial baseline clearance measurement with no voltage applied.

For example, 511 and 512 of control signal 510a may be generated by computer 420 to cause optical range determining device 410 to measure the clearance of slider body 101. While FIG. 5 shows that two measurements of the slider body change in clearance are made during a given rotation of hard disk 101, in embodiments of the present invention one or more measurements of the change in clearance of slider body 101 relative to hard disk 102 may be performed during the time that the continuous DC pulses are applied. Additionally, the measurement of the change in clearance of slider body 101 may occur during the entirety of a continuous DC pulse applied between slider body 101 and hard disk 102, or during a fraction thereof as shown in FIG. 5.

In revolution 2, a first continuous positive bias voltage 520 is applied between slider body 101 and hard disk 102. In the embodiment of FIG. 5, voltage 520 is a positive one volt direct current (DC) voltage. It is noted that in embodiments of the present invention another voltage (e.g., one half volt), or another bias (e.g., negative bias) may be applied. Concurrent with the generation of voltage 520, pulses 521 and 522 of control signal 520a initiate measurement of the clearance of slider body 101 to determine any change in slider body clearance when voltage 520 is applied. It is noted that pulses 521 and 522 are initiated such that they occur at the locations of hard disk 102 that coincide with the location of previously generated pulses 511 and 512 respectively. This can be accomplished, for example, by timing the initiation of pulse 531 and pulse 531 relative to the spindle index of hard disk 102, or relative to sector/servo positioning information. Advantageously, this permits determining an average change in clearance of slider body 101 at a given voltage and at a specific discrete location of hard disk 102.

As a result, embodiments of the present invention facilitate greater precision in the measurement of the change in clearance of slider body 101 than in conventional systems. Additionally, this permits measuring the change in clearance, and thus the contact potential voltage, at discrete locations of hard disk 102 rather than an entire data track as is typically performed.

In revolution 3, a continuous negative bias voltage 530 is applied between slider body 101 and hard disk 102. In the embodiment of FIG. 5, voltage 530 is a one volt direct current (DC) pulse. Concurrent with the generation of voltage 530, pulses 531 and 532 of control signal 530a initiate measurement of the clearance of slider body 101 to determine any change in clearance when voltage 530 is applied relative to the baseline clearance measurement performed when no voltage is applied (e.g., 510). Again, the timing of pulse 531 may be initiated such that it coincides with control signal pulses 511 and 521. Similarly, the timing of pulse 532 may be initiated such that it coincides with signal pulses 512 and 522. In embodiments of the present invention, the magnitude of the direct current (DC) voltages is increased in successive cycles in order to plot (e.g., FIGS. 6A and 6B) the response of the slider/hard disk interface to changes in bias voltage. This facilitates determining the contact potential voltage for the slider/hard disk interface: the point of maximum clearance is where the applied bias cancels the slider body/hard disk contact potential.

In revolution 4, a second continuous positive bias voltage 540 is applied between slider body 101 and hard disk 102. In the embodiment of FIG. 5, voltage 540 is a two volt direct current (DC) voltage. Concurrent with the generation of voltage 540, pulses 541 and 542 of signal 540a initiate measurement of the clearance change of slider body 101. It is noted that pulse 541 and pulse 542 are initiated such that they occur at the locations of hard disk 102 that coincide with the location of previously applied voltage pulses (e.g., 511, 512, 521, 522, 531, and 532) respectively. In embodiments of the present invention, a change in the clearance of slider body 101 is determined as described above concurrent with the application of pulses 541 and 542.

In revolution 5, a second continuous negative bias voltage 550 is applied between slider body 101 and hard disk 102. In the embodiment of FIG. 5, voltage 550 is a two volt direct current (DC) voltage. Concurrent with the generation of voltage 550, pulses 551 and 552 of signal 550a initiate measurement of the clearance of slider body 101 relative to hard disk 102 to determine any change in clearance of slider body 101 at the voltage of 550. It is noted that pulse 551 and pulse 552 are initiated such that they occur at the locations of hard disk 102 that coincide with the location of previously applied voltage pulses 511, 512, 521, 522, 531, 532, 541, and 542, respectively. In embodiments of the present invention, a change in the clearance of slider body 101 relative to the baseline measurement when no voltage is applied (e.g., 510) is determined as described above concurrent with the application of pulses 551 and 552.

Thus, embodiments of the present invention facilitate measuring circumferential variations in hard disk 102 due to disk microwaviness which cannot typically be resolved with other methods. These variations in surface topography of the disk (e.g., micro-waviness, roughness, and/or texture) can also cause variations in the contact potential over different locations on the disk which cannot be precisely mapped using the conventional art. In the present invention, the use of positive and negative voltages, reduces the risk of charging the slider/hard disk interface. Thus, there is less likelihood of lubricant migration and/or drawing particles to the slider/hard disk interface in embodiments of the present invention. Furthermore, by measuring variations of slider body clearance over the same portion of hard disk 102 in response to applied voltages and deriving a corresponding average clearance, a more precise measurement of the contact potential and/or disk clearance at that discrete location of the hard disk is possible than in conventional methods.

Figure 6A:
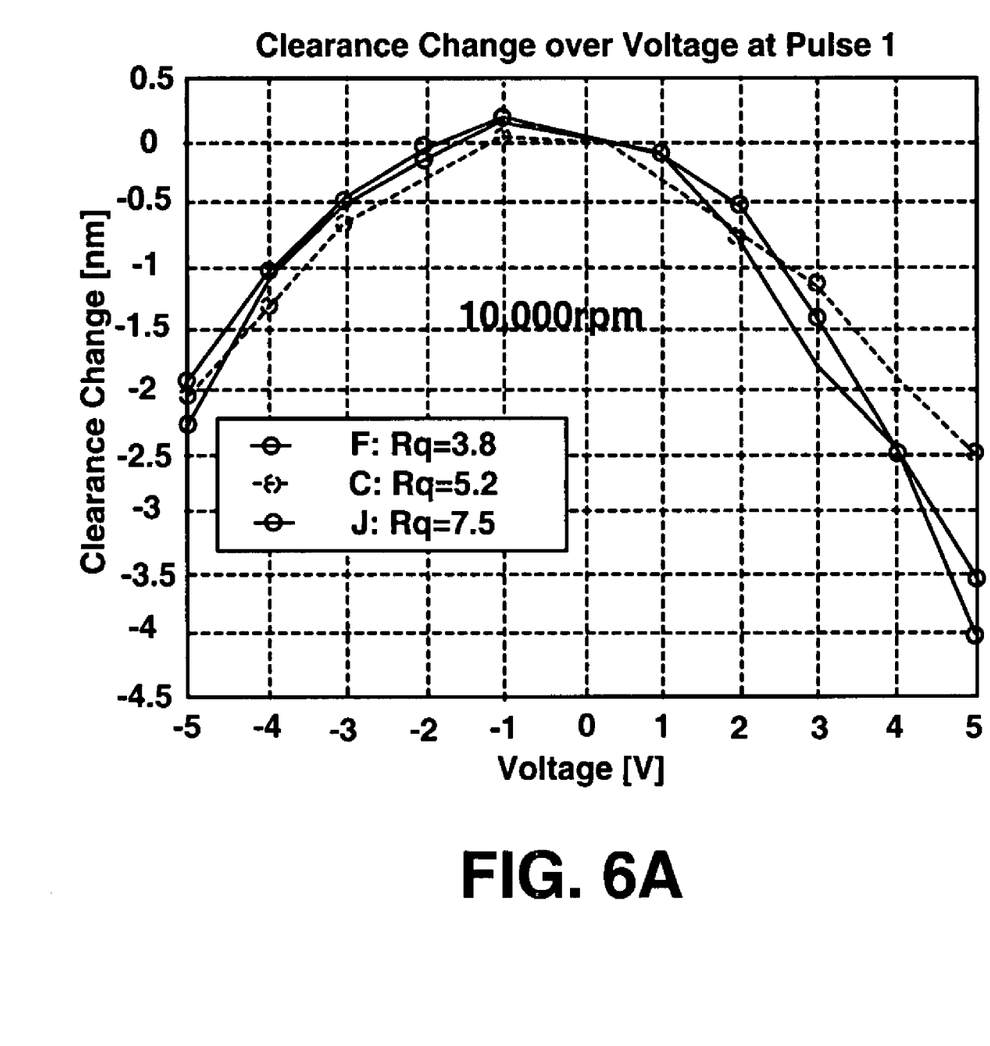
FIGS. 6A and 6B are graphs showing the clearance of a slider body relative to a hard disk in response to variations in an applied bias voltage in accordance with embodiments of the present invention.

FIGS. 6A and 6B are graphs showing the change in the clearance of a slider body relative to a hard disk in response to variations in an applied bias voltage in accordance with embodiments of the present invention. In FIG. 6A, a positive DC voltage of 1 volt (e.g., voltage 520 of FIG. 5) causes the clearance of slider body 101 to drop approximately 0.1 nanometer with reference to the clearance of slider body 101 when no voltage is applied (e.g., 510 of FIG. 5). When a negative DC voltage of 1 volt (e.g., voltage 530 of FIG. 5) is applied, the clearance of slider body 101 rises approximately 0.2 nanometers relative to the clearance of slider body 101 when no voltage is applied (e.g., 510 of FIG. 5). A positive DC voltage of 2 volts (e.g., voltage 540 of FIG. 5) causes the clearance of slider body 101 to drop 0.6 nanometers relative to the clearance of slider body 101 when no voltage is applied (e.g., 510 of FIG. 5A). A negative DC voltage of 2 volts (e.g., voltage of FIG. 5) causes the clearance of slider body 101 to drop approximately 0.2 nanometers relative to the clearance of slider body 101 when no voltage is applied (e.g., 510 of FIG. 5). In FIG. 6A the plot of the clearance of slider body 101 is continued through a voltage of +5 volts DC and −5 volts DC. It is noted that in FIG. 6A, the clearance of slider body 101 reaches a peak at approximately −1 volt. This indicates that the contact potential voltage is approximately 1 volt. Subsequently, during normal operation of hard disk drive 100, a bias of −1 volt can be applied to the interface of slider 101 and hard disk 102 to cancel the contact potential voltage.

Figure 6B:
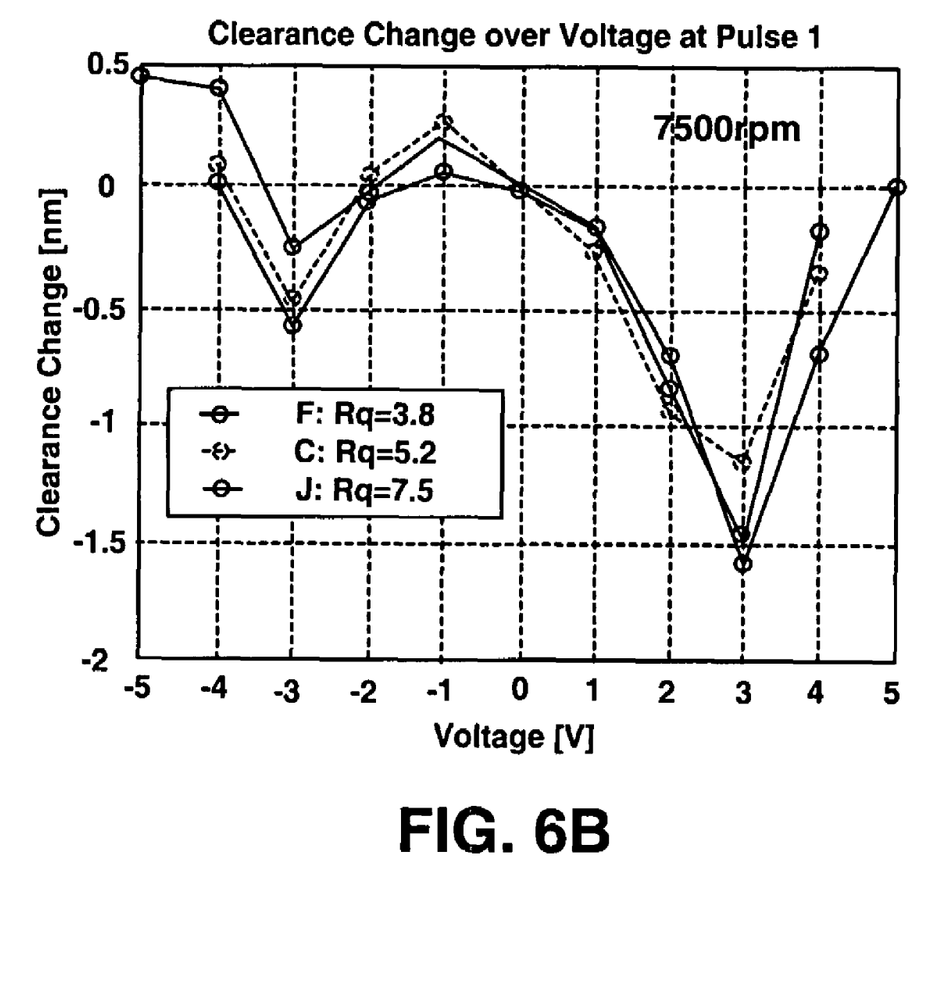

In FIG. 6B, a positive DC voltage of 1 volt (e.g., voltage 520 of FIG. 5) causes the clearance of slider body 101 to drop approximately 0.2 nanometers relative to the clearance of slider body 101 when no voltage is applied (e.g., 510 of FIG. 5). When a negative DC voltage of 1 volt (e.g., voltage 530 of FIG. 5) is applied, the clearance of slider body 101 rises approximately 0.1-0.2 nanometers relative to the clearance of slider body 101 when no voltage is applied (e.g., 510 of FIG. 5). A positive DC voltage of 2 volts (e.g., voltage 540 of FIG. 5) causes the clearance of slider body 101 to drop 0.7-0.8 nanometers relative to the clearance of slider body 101 when no voltage is applied (e.g., 510 of FIG. 5). A negative DC voltage of 2 volts (e.g., voltage 550 of FIG. 5) causes no significant change in the clearance of slider body 101 relative to the clearance of slider body 101 when no voltage is applied (e.g., 510 of FIG. 5). In FIG. 6B the plot of the clearance of slider body 101 is continued through a voltage of +5 volts DC and −5 volts DC. Again, it is noted that in FIG. 6B, the clearance of slider body 101 reaches a peak at approximately −1 volt. This indicates that the contact potential voltage is approximately 1 volt. Subsequently, during normal operation of hard disk drive 100, a bias of −1 volt can be applied to the interface of slider 101 and hard disk 102 to cancel the contact potential voltage.

Additionally, the maximum drop in the clearance of slider body 101 occurs when a bias of +3 volts DC is applied. This indicates that slider body comes into contact with hard disk 102 when a positive bias of +3 volts DC is applied. A similar effect is exhibited when a bias of −3 volts DC is applied. It is noted that there is a difference in maximum drop in the clearance when a positive or negative voltage is applied.

This maybe caused by lube pooling between the slider and disk at the here exemplary slider-disk combination used here. When biases of +/−4 volts and +/−5 volts are applied, slider body 101 exhibits a smaller drop in the clearance relative to hard disk 102. In embodiments of the present invention, the magnitude of the voltages applied at the slider body/hard disk interface are increased until contact between slider body 101 and hard disk 102 is detected. This facilitates determining the absolute slider body clearance relative to hard disk 102 at a given voltage.

Figure 7:
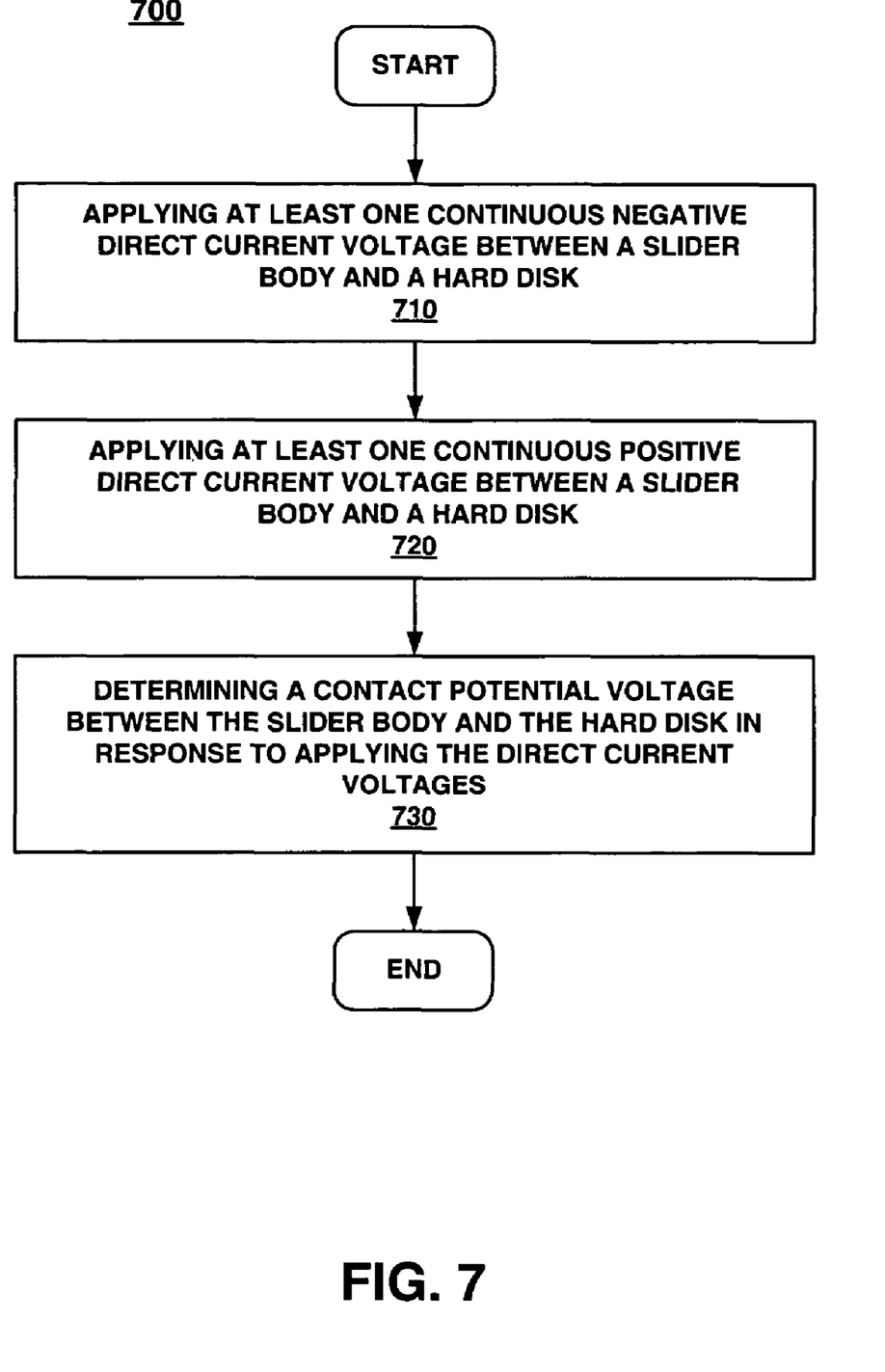
FIG. 7 is a flowchart of a method for determining contact potential voltages and clearance data between a slider body and a hard disk of a hard disk drive in accordance with embodiments of the present invention.

FIG. 7 is a flowchart of a method for determining contact potential voltages between a slider body and a hard disk of a hard disk drive in accordance with embodiments of the present invention. In step 710 of FIG. 7, at least one continuous negative direct current (DC) voltage is applied between a slider body and a hard disk. As described above with reference to FIG. 5, embodiments of the present invention apply continuous DC voltage between slider body 101 and hard disk 102. Concurrent with the application of this voltage, a measurement of a change in the clearance between the slider body is made.

In step 720 of FIG. 7, at least one continuous positive direct current (DC) voltage is applied between a slider body and a hard disk. It is noted that in embodiments of the present invention, the application of the at least one continuous positive direct current (DC) voltage may precede the application of the at least one continuous negative direct (DC) voltage. As discussed above, concurrent with the application of this voltage, a measurement of the clearance change between the slider body and the hard disk is made.

In step 730 of FIG. 7, a contact potential voltage between the slider body and the hard disk is determined in response to applying the direct current voltages. By plotting the changes in the clearance of slider body 101 in response to changes in the voltage and/or bias applied at the slider/hard disk interface, it is possible to determine the maximum clearance of the slider body at a particular bias voltage. In so doing, it is possible to determine the contact potential voltage. For example, as discussed above with reference to FIG. 6A, the clearance of slider body 101 reaches maximum clearance at approximately −1 volt. This indicates that the contact potential voltage is approximately 1 volt. Subsequently, during normal operation of hard disk drive 100, a bias of −1 volt can be applied to the interface of slider 101 and hard disk 102 to counter the contact potential voltage.

As discussed above, it is possible to apply the continuous voltage between slider body 101 and hard disk 102 and measure the read back signal amplitude at different sectors of the disk, thereby measuring changes in clearance at different locations within one revolution. In so doing, variations in the contact potential voltage corresponding to, for example, variations in the surface topography of hard disk 102 (e.g., micro-waviness, roughness, and/or texture) can be plotted. Subsequently, during normal operation of hard disk drive 100, the bias voltage applied to the interface of slider 101 and hard disk 102 can be dynamically varied to eliminate the changes in contact potential voltage.

The preferred embodiment of the present invention, method and system for determining contact potential voltage between a slider body and a hard disk of a hard disk drive, is thus described. While the present invention has been described in particular embodiments, it should be appreciated that the present invention should not be construed as limited by such embodiments, but rather construed according to the following claims.

What is claimed is:

1. A method for determining contact potential voltage between a slider body and a hard disk of a hard disk drive, said method comprising:
  applying at least one continuous negative direct current (DC) voltage between said slider body and said hard disk;
  ceasing application of said at least one continuous negative direct current (DC) voltage;
  applying at least one continuous positive direct current (DC) voltage between said slider body and said hard disk; and
  in response to applying said direct current (DC) voltages, determining a contact potential voltage due to a difference in work function between said slider body and said hard disk.

2. The method as recited in claim 1 wherein said method further comprises:
  applying said at least one continuous negative direct current (DC) voltage at a pre-determined voltage between said slider body and said hard disk;
  ceasing application of said at least one continuous negative direct current (DC) voltage; and
  applying said at least one continuous positive direct current (DC) voltage at a pre-determined voltage between said slider body and said hard disk.

3. The method as recited in claim 2 further comprising:
  measuring a clearance change of said slider body in response to applying at least one continuous negative direct current (DC) voltage between said slider body and said hard disk and in response to applying at least one continuous positive direct current (DC) voltage between said slider body and said hard disk.

4. The method as recited in claim 3 further comprising:
  determining a maximum clearance of said slider body relative to said hard disk in response to said measuring.

5. The method as recited in claim 3 further comprising:
  determining said clearance change of said slider body using an optical range determining device.

6. The method as recited in claim 3 further comprising:
  determining said clearance change of said slider body by sensing a variation in the amplitude of a readback signal.

7. The method as recited in claim 1 further comprising:
  measuring said clearance change of said slider body when said slider body is proximate to a discrete location of said hard disk.

8. A system for determining a contact potential voltage between a slider body and a hard disk of a hard disk drive comprising:
  a housing;
  a disk pack mounted to said housing and comprising said hard disk that is rotatable relative to said housing, the disk pack defining an axis of rotation and a radial direction relative to the axis;
  a slider body mounted to said housing and disposed proximate to said hard disk;
  a voltage adjuster coupled with said slider body and with said hard disk, said voltage adjuster comprising:
  a direct current (DC) pulse generator; and
  a direct current (DC) voltage controller;
  a processor coupled with said voltage adjuster, said processor configured for determining said contact potential voltage;
  a detector coupled with said slider body and with said processor; and wherein said voltage adjuster generates at least one continuous positive direct current (DC) voltage and at least one continuous negative direct current (DC) voltage at a pre-designated voltage between said hard disk and said slider body.

9. The system of claim 8 wherein said processor determines a clearance change of said slider body in response to said at least one continuous negative direct current (DC) voltage and said at least one continuous positive direct current (DC) voltage.

10. The system of claim 9 wherein said processor causes said detector to measure said clearance change of said slider body and a discrete location of said hard disk in response to said at least one continuous negative direct current (DC) voltage and said at least one continuous positive direct current (DC) voltage.

11. The system of claim 9 wherein said processor further determines a maximum clearance of slider body relative to said hard disk.

12. The system of claim 8 wherein said detector comprises an optical range determining device.

13. The system of claim 8 wherein said detector comprises a component for sensing a variation in the amplitude of a readback signal.

14. A system comprising:
a disk pack comprising at least one hard disk;
a slider body disposed proximate to said hard disk;
a generating means for generating at least one continuous negative direct current (DC) voltage and at least one continuous positive direct current (DC) voltage between said hard disk and said slider body; and
a processing means for determining a contact potential voltage in response to said generating, said contact potential voltage due to a difference in work function between said slider body and said hard disk.

15. The system of claim 14 wherein said generating means further comprises:
a controller means for controlling the voltage of said at least one continuous negative direct current (DC) voltage and said at least one continuous positive direct current (DC) voltage.

16. The system of claim 14 further comprising:
a measuring means coupled with said processing means for measuring a clearance change of said slider body.

17. The system of claim 16 wherein said processing means is further for causing said measuring means to measure said clearance change when said slider body is proximate to a discrete location of said hard disk.

18. The system of claim 14 wherein said processing means is further for determining a maximum clearance of said slider body.

19. The system of claim 18 wherein said processing means is further for determining said contact potential voltage based upon said determining said maximum clearance of said slider body relative to said hard disk.

* * * * *